US012740672B2

(12) United States Patent
Kimmerle

(10) Patent No.: US 12,740,672 B2
(45) Date of Patent: Sep. 22, 2026

(54) BIO-BASED PRODUCTS AND METHODS FOR MANUFACTURING THE SAME

(71) Applicant: Katherine A. Kimmerle, Northbrook, IL (US)

(72) Inventor: Katherine A. Kimmerle, Northbrook, IL (US)

(*) Notice: Subject to any disclaimer, the term of this patent is extended or adjusted under 35 U.S.C. 154(b) by 312 days.

(21) Appl. No.: 18/198,936

(22) Filed: May 18, 2023

(65) Prior Publication Data

US 2024/0382047 A1 Nov. 21, 2024

(51) Int. Cl.

| | |
|---|---|
| ***A47K 7/02*** | (2006.01) |
| ***C08L 3/04*** | (2006.01) |
| ***C08L 23/06*** | (2006.01) |
| ***C08L 99/00*** | (2006.01) |

(52) U.S. Cl.

CPC .................................... *A47K 7/02* (2013.01); *C08L 3/04* (2013.01); *C08L 23/06* (2013.01); *C08L 99/00* (2013.01); *C08L 2203/14* (2013.01); *C08L 2203/30* (2013.01)

(58) Field of Classification Search

CPC .. A47K 7/02; A47K 7/03; A47K 11/10; A47L 13/16; A47L 13/17; A47L 13/18; A47L 13/19; C08L 3/04; C08L 2203/14; C08L 2203/30; C08L 23/06; C08L 99/00; A46B 9/021

USPC .............. 15/227, 244.1, 244.2, 244.3, 244.4; 132/218

See application file for complete search history.

(56) References Cited

U.S. PATENT DOCUMENTS

| | | | |
|---|---|---|---|
| 5,124,371 | A | 6/1992 | Tokiwa et al. |
| 5,320,669 | A | 6/1994 | Lim et al. |
| 5,393,804 | A | 2/1995 | George et al. |
| 5,449,708 | A | 9/1995 | Schiltz |
| 5,827,905 | A | 10/1998 | Grigat et al. |
| 7,015,269 | B1 | 3/2006 | Grutke et al. |
| 7,071,249 | B2 | 7/2006 | Ho et al. |
| 8,231,954 | B2 | 7/2012 | Li et al. |
| 9,353,258 | B2 | 5/2016 | Krishnaswamy et al. |
| 10,919,189 | B2 | 2/2021 | Wendeln et al. |

(Continued)

FOREIGN PATENT DOCUMENTS

| | | | |
|---|---|---|---|
| DE | 202022104226 U1 * | 8/2022 | ............... A47K 7/02 |
| EP | 2591904 A1 * | 5/2013 | ............. B29C 48/08 |

(Continued)

OTHER PUBLICATIONS

DE202022104226—Machine Translation (Year: 2022).*

(Continued)

*Primary Examiner* — Brian D Keller
*Assistant Examiner* — Alberto Saenz
(74) *Attorney, Agent, or Firm* — King & Partners, PLC

(57) ABSTRACT

A product adapted to cleanse at least a portion of a user's body, including a bio-based material, wherein the bio-based material includes the shape of a cleansing product, and wherein the bio-based material is derived from sugar cane and/or tapioca starch. The bio-based material provides an environmentally sustainable alternative to traditional petroleum-based cleansing products while maintaining desirable sensory characteristics including softness and flexibility. The products may be manufactured using a heat treatment process that enhances both composability and user experience.

3 Claims, 2 Drawing Sheets

(56) References Cited

U.S. PATENT DOCUMENTS

| | | | | |
|---|---|---|---|---|
| 2002/0028857 | A1 | 3/2002 | Holy | |
| 2007/0147942 | A1* | 6/2007 | Sojka | B65D 65/46 401/7 |
| 2009/0018235 | A1 | 1/2009 | Nascimento et al. | |
| 2009/0110654 | A1 | 4/2009 | Hagemann et al. | |
| 2009/0274920 | A1 | 11/2009 | Li et al. | |
| 2011/0056036 | A1* | 3/2011 | Kuester | A46B 5/04 15/207.2 |

FOREIGN PATENT DOCUMENTS

| | | | |
|---|---|---|---|
| JP | H11267063 | A * | 10/1999 |
| KR | 101962719 | | 3/2019 |
| WO | WO 1999/11699 | | 3/1999 |
| WO | WO 2021/029718 | | 2/2021 |

OTHER PUBLICATIONS

JP H11267063—Machine Translation (Year: 1999).*

Author: Plastima Title: What is Polyethylene (PE) Pub. Date: Dec. 15, 2019 URL: https://web.archive.org/web/20191215185556/http://www.plastima.lt/en/lcatalog/product/15/polyethylene-(pe)/ (Year: 2019).*

* cited by examiner

BIO-BASED PRODUCTS AND METHODS FOR MANUFACTURING THE SAME

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A SEQUENCE LISTING

Not applicable.

BACKGROUND OF THE INVENTION

1. Field of the Invention

The present invention relates in general to bio-based products (e.g., sponges, loofahs, shower gloves, exfoliating mittens, cleansing accessories, etcetera) and, more particularly, to bio-based products that are preferably derived from, for example, sugar cane and/or tapioca starch that are environmentally desirable relative to traditional, petroleum-based products. The present invention further relates to methods for manufacturing bio-based products that enhance composability, as well as sensory perception (e.g., uniform, soft, non-brittle, etcetera) of these products by the user.

2. Background Art

Bio-based materials have been known in the art for years and are the subject of a plurality of patents and publications, including: U.S. Pat. No. 10,919,189 entitled "Biocomposite and/or Biomaterial with Sunflower Seed Shell/Husks," U.S. Pat. No. 9,353,258 entitled "Low Glass Transition Polyhydroxyalkanoates for Modification of Biodegradable Polymers," U.S. Pat. No. 7,015,269 entitled "Biodegradable, Thermoplastic Molding Materials," U.S. Pat. No. 5,827,905 entitled "Biodegradable Plastics Filled with Reinforcing Materials," U.S. Pat. No. 5,124,371 entitled "Biodegradable Plastic Composition, Biodegradable Plastic Shaped Body and Method of Producing Same," United States Patent Application Publication Number 2009/0018235 entitled "Environmentally Degradable Polymeric Composition and Process for Obtaining an Environmentally Degradable Polymeric Composition," United States Patent Application Publication Number 2002/0028857 entitled "Compostable, Degradable Plastic Compositions and Articles Thereof," International Patent Publication Number WO 2021/029718 entitled "Rice-Processed Plastic Composition, and Method for Producing Same," International Patent Publication Number WO 1999/11699 entitled "Biodegradable Plastic Articles Having a Reduced Rate of Moisture-Induced Degradation," and Korean Patent Number KR101962719 entitled "Carbon-Neutral Bio-Based Plastics with Enhanced Mechanical Properties, Thermoplastic Biomass Composite Used for Preparing the Same and Methods for Preparing Them"-all of which are hereby incorporated herein by reference in their entirety including all references cited therein.

U.S. Pat. No. 10,919,189 appears to disclose a biomaterial and/or a biocomposite based on sunflower seed shells/husks. According to the invention, it is proposed that sunflower seed shells/husks are used instead of wood, bamboo or other wood-like fiber products as the original material for the biocomposite products and are used for the production of such products in order to improve the previous biomaterials, and in particular also to design said materials for improved cost efficiency and to improve their material properties.

U.S. Pat. No. 9,353,258 appears to disclose compositions of biobased polymer blends of polymers of polybutylene succinate (PBS) or polybutylene-adipate-terephthalate (PBAT) and a polyhydroxyalkanoate copolymer. In certain embodiments, the copolymer is a multi-phase copolymer blend having one phase a glass transition temperature of about −5° C. to about −50° C. Methods of making the compositions of the invention are also described. The invention also includes articles, films and laminates comprising the compositions.

U.S. Pat. No. 7,015,269 appears to disclose a biodegradable thermoplastic molding composition that comprises (a) at least one biodegradable thermoplastic copolyester, and (b) based on the total weight of the thermoplastic molding composition, from 0.01% to 15% by weight of at least one hydrophobicized phyllosilicate. A process for preparing the molding composition is described, as is a process for producing moldings, films or fibers from the molding composition.

U.S. Pat. No. 5,827,905 appears to disclose reinforced thermoplastic molding compositions that are prepared from biodegradable polymers, for example aliphatic or polyester amides, aliphatic polyester urethanes, and to the use thereof for the production of moldings and to the moldings, wherein the reinforcing materials are selected from wood flour/sawdust, fibers of natural origin, minerals of natural origin, cellulose and cellulose derivatives.

U.S. Pat. No. 5,124,371 appears to disclose a biodegradable plastic composition which includes a polycaprolactone and a poly-β-hydroxybutyrate. Disclosed also is a biodegradable plastic shaped body formed of such a composition. The shaped body may be produced by melt-mixing a blend of a polycaprolactone, a poly-β-hydroxybutyrate and a copolymerization catalyst to copolymerize a portion of the polycaprolactone with a portion of the poly-β-hydroxybutyrate to obtain a caprolactone/β-hydroxybutyric acid copolymer-containing melt, which is subsequently shaped into a desired form.

United States Patent Application Publication Number 2009/0018235 appears to disclose a polymeric composition that is prepared from a biodegradable polymer defined by poly-hydroxybutyrate (PHB) or copolymers thereof, and at least one other biodegradable polymer, such as polycaprolactone (PCL) and poly (lactic acid) (PLA), so as to alter its structure, and further at least one additive of the type of natural filler and natural fibers, and, optionally, nucleate, thermal stabilizer, processing aid, with the object of preparing an environmentally degradable material. According to the production process described herein, the composition resulting from the mixture of the modified biodegradable polymer and additives can be utilized in the manufacture of injected packages for food products, injected packages for cosmetics, tubes, technical pieces and several injected products.

United States Patent Application Publication Number 2002/0028857 appears to disclose thermoplastic compositions which are degradable and/or compostable, the method of preparation of the degradable and/or compostable compositions and use of the degradable and/or compostable compositions in a monofilament, shaped article or film, or may be used as a coating, e.g., of paper, to achieve a stronger article. These compositions have the advantage over existing biodegradable and compostable compositions by exhibiting a higher dimensional stability and comparatively low cost.

International Patent Publication Number WO 2021/029718 appears to disclose a rice-processed plastic composition, and a method for producing same. The rice-processed plastic composition is produced by pressing a mixture of rice powder and water under predetermined temperature and pressure conditions. The rice-processed plastic composition and the method for producing same according to the present invention can be used to produce biodegradable plastics having excellent physical properties and stability using rice, which is a biodegradable natural substance, through a simple process using organic acids, sugars, and vegetable oils, and since such plastics can be decomposed by microorganisms in nature after being landfilled or incinerated, environmental pollution, such as soil pollution and air pollution, caused by landfilling or incineration can be minimized.

International Patent Publication Number WO 1999/11699 appears to disclose methods of extruding a substantially biodegradable plastic by combining initial ingredients comprising a biodegradable fiber, a stiffener, and a biodegradable polymer and extruding the resulting material. The invention also comprises extrudable fiber-based compositions comprising a natural fiber, a stiffener, and a biodegradable polymer such that said compositions can be extruded under heat to produce a substantially biodegradable extrudate. The invention further comprises coated plastic articles and composites produced according to these methods.

Korean Patent Number KR101962719 appears to disclose carbon-neutral bio-based plastics having improved mechanical properties, thermoplastic biomass complexes used in the production thereof, and a process for producing the same. Specifically, the '719 patent discloses a method for producing thermoplastic biomass complexes by thermomechanical mixing starch-based biomass selected from plant microfine powder and fiber-based biomass selected from plant fiber of plants to produce a thermoplastic biomass complex.

While the above-identified patents and publications do appear to disclose various bio-based materials, their configurations remain non-desirous and/or problematic inasmuch as, among other things, none of the above-identified bio-based materials appear to be high bio-content materials derived from, for example, sugar cane and/or tapioca starch that are environmentally desirable relative to traditional, petroleum-based products. Moreover, none of the above-identified bio-based materials appear to enhance composability and/or sensory perception by the user.

These and other objects of the present invention will become apparent in light of the present specification, claims, and drawings.

SUMMARY OF THE INVENTION

The following presents a simplified summary in order to provide a basic understanding of some aspects of the claimed subject matter. This summary is not an extensive overview, and is not intended to identify key/critical elements or to delineate the scope of the claimed subject matter. Its purpose is to present some concepts in a simplified form as a prelude to the more detailed description that is presented later.

The present invention is directed to a product (e.g., a sponge, a loofah, a shower glove, etcetera) adapted to cleanse at least a portion of a user's body, comprising, consisting essentially of, and/or consisting of: a bio-based material, wherein the bio-based material comprises the shape of a cleansing product.

In a preferred embodiment of the present invention, the bio-based material is derived from sugar cane.

In another preferred embodiment of the present invention, the bio-based material comprises low-density polyethylene. In this embodiment, the low-density polyethylene preferably comprises a density ranging from approximately (+/−5%) 917 to approximately (+/−5%) 930 kg/$m^3$.

In yet another preferred embodiment of the present invention, the bio-based material preferably comprises at least 90% by weight bio-based content, more preferably comprises at least 98% by weight bio-based content, and yet more preferably comprises 100% by weight bio-based content.

In one preferred embodiment of the present invention, the product further comprises a bio-based colorant.

In another aspect of the present invention, the product further comprises a solvent, a co-solvent, a surfactant, a substrate, a wetting agent, a rheology modifier, a pH modifier, a matting agent, a defoaming agent, a lubricity modifier, a taber additive, a filler, a pigment, a color additive, and/or a tinting agent.

In a preferred embodiment of the present invention, the sugar cane derived material is compostable based upon ASTM 6400 standards.

In a preferred implementation of the present invention, the bio-based material is derived from tapioca starch.

In another preferred implementation of the present invention, the bio-based material comprises a hydrophobic thermoplastic starch. In this embodiment, the bio-based material preferably comprises at least 80% by weight bio-based content.

In yet another preferred implementation of the present invention, the tapioca starch derived material is compostable based upon ASTM 6400 standards.

BRIEF DESCRIPTION OF THE DRAWINGS

Certain embodiments of the present invention are illustrated by the accompanying figures. It will be understood that the figures are not necessarily to scale and that details not necessary for an understanding of the invention or that render other details difficult to perceive may be omitted.

It will be further understood that the invention is not necessarily limited to the particular embodiments illustrated herein.

Figure 1:
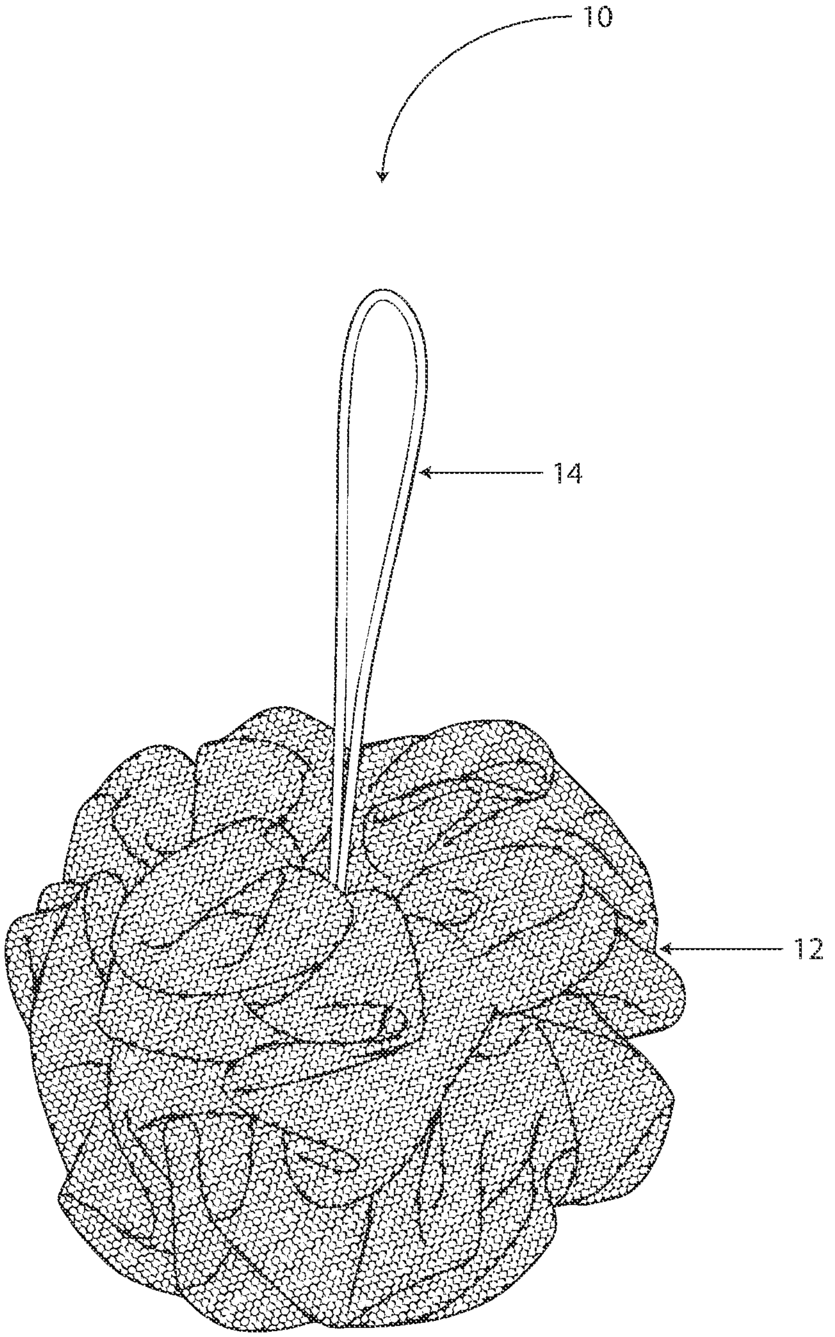
Figure 2:
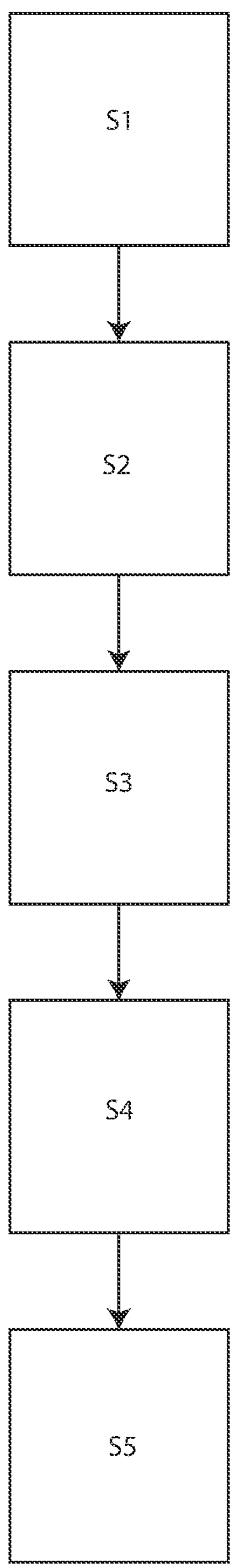

The invention will now be described with reference to the drawings wherein:

FIG. 1 of the drawings is a perspective view of sponge fabricated in accordance with the present invention; and FIG. 2 of the drawings is a schematic diagram showing a method of manufacturing products in accordance with the present invention.

DETAILED DESCRIPTION OF THE INVENTION

While this invention is susceptible of embodiment in many different forms and applications, there are shown in the drawings and described herein in detail several specific embodiments with the understanding that the present disclosure is to be considered as an exemplification of the principles of the invention and is not intended to limit the invention to the embodiments illustrated.

It will be understood that like or analogous elements and/or components, referred to herein, may be identified throughout the drawings by like reference characters. In addition, it will be understood that the drawings are merely schematic representations of one or more embodiments of the invention, and some of the components may have been distorted from their actual scale for purposes of pictorial clarity.

In accordance with the present invention, bio-based products (e.g., sponges, loofahs, shower gloves, exfoliating mittens, cleansing accessories, etcetera) are disclosed that are preferably derived from, for example, sugar cane and/or tapioca starch. These products are optionally compostable and environmentally desirable relative to traditional, petroleum-based products. The products of the present invention are manufactured utilizing a novel process that enhances composability, as well as sensory perception of these products by the user. It will be understood that conventional products made from bio-based materials are often course, brittle and/or otherwise unappealing to the skin compared to traditional, petroleum-based plastic products. The products of the present invention are bio-based, optionally compostable, and provide the user with a pleasant user experience because they are uniformly soft and non-brittle.

Referring now to the drawings, and to FIG. 1 in particular, a first embodiment of product 10, adapted to cleanse at least a portion of a user's body, (in this case a sponge), is shown as generally comprising mesh body 12 and fixing string 14.

In one embodiment, mesh body 12 is an at least partially bio-based plastic (e.g., thermoplastic) and derived from, for example, sugar cane, tapioca starch or a combination of both. It will be understood that, unless otherwise specified, the chemical compounds/materials provided herein, or their precursors, are available from commercial chemical vendors, such as Sigma-Aldrich Chemical Co., (St. Louis, Missouri), Braskem (São Paulo, Brazil), and Green World Biotech Materials Co., Ltd. (Tainan, Taiwan).

In one embodiment of the present invention, mesh body 12 comprises a low-density polyethylene (LDPE) plastic derived from sugar cane. In this embodiment, the LDPE comprises a density ranging from approximately 917 to approximately 930 kg/$m^3$. Advantageously, and depending on the formulation, the bio-based content of this material exceeds at least 90%, more preferably 98%, and most preferably comprises 100% by weight bio-based content. This is especially true if a bio-based or non-petroleum-based colorant is utilized, such as zinc oxide, titanium dioxide, iron oxide, etcetera.

In another embodiment, mesh body 12 is an at least partially bio-based plastic (e.g., thermoplastic) and derived from, for example, tapioca starch. In this embodiment, the bio-based material comprises a hydrophobic thermoplastic having an at least 80% by weight bio-based content. Disclosure regarding preparation of this material and others is provided in U.S. Pat. No. 11,414,535 B2 Entitled "Hydrophobic Thermoplastic Starch Composite and Method for Manufacturing the Same,"—which is hereby incorporated herein by reference in its entirety including all references cited therein.

Advantageously, the bio-based materials disclosed herein have been determined to comply with ASTM 6400 standards and are compostable within 90 days of commencement of composting.

Mesh body 12 may further include, a solvent, a co-solvent, a surfactant, a substrate, a wetting agent, a rheology modifier, a pH modifier, a matting agent, a defoaming agent, a lubricity modifier, a taber additive, a filler, a pigment, a color additive, a tinting agent, a biodegradation additive, and/or a bio-assimilation promoting additive.

One preferred solvent for use in accordance with the present invention includes, water that has preferably been distilled, deionized, and/or filtered via reverse osmosis, as well as polar, non-polar, protic, and aprotic solvents. Additional examples of solvents and/or co-solvents include propylene glycol n-butyl ether, propylene glycol monoethyl ether, glygol ether EB, proglyme—just to name a few.

In certain embodiments of the present invention, an anionic surfactant may be utilized. Suitable examples include taurates; isethionates; alkyl and alkyl ether sulfates; succinamates; alkylaryl sulfonates; olefin sulfonates; alkoxy alkane sulfonates; sodium and potassium salts of fatty acids derived from natural plant or animal sources or synthetically prepared; sodium, potassium, ammonium, and alkylated ammonium salts of alkylated and acylated amino acids and peptides; alkylated sulfoacetates; alkylated sulfosuccinates; acylglyceride sulfonates, alkoxyether sulfonates; phosphoric acid esters; phospholipids; and combinations thereof. Specific anionic surfactants contemplated for use include, but are by no means limited to, ammonium cocoyl isethionate, sodium cocoyl isethionate, sodium lauroyl isethionate, sodium stearoyl isethionate, sodium lauroyl sarcosinate, sodium cocoyl sarcosinate, sodium lauryl sarcosinate, disodium laureth sulfosuccinate, sodium lauryl sulfoacetate, sodium cocoyl glutamate, TEA-cocoyl glutamate, TEA cocoyl alaninate, sodium cocoyl taurate, potassium cetyl phosphate, and combinations thereof.

In certain embodiments of the present invention, one or more cationic surfactants may be utilized. Suitable examples include alkylated quaternary ammonium salts $R_4NX$; alkylated amino-amides ($RCONH—(CH_2)_n)NR_3X$; alkylimidazolines; alkoxylated amines; and combinations thereof. Specific examples of anionic surfactants contemplated for use include, but are by no means limited to, cetyl ammonium chloride, cetyl ammonium bromide, lauryl ammonium chloride, lauryl ammonium bromide, stearyl ammonium chloride, stearyl ammonium bromide, cetyl dimethyl ammonium chloride, cetyl dimethyl ammonium bromide, lauryl dimethyl ammonium chloride, lauryl dimethyl ammonium bromide, stearyl dimethyl ammonium chloride, stearyl dimethyl ammonium bromide, cetyl trimethyl ammonium chloride, cetyl trimethyl ammonium bromide, lauryl trimethyl ammonium chloride, lauryl trimethyl ammonium bromide, stearyl trimethyl ammonium chloride, stearyl trimethyl ammonium bromide, lauryl dimethyl ammonium chloride, stearyl dimethyl cetyl ditallow dimethyl ammonium chloride, dicetyl ammonium chloride, dilauryl ammonium chloride, dilauryl ammonium bromide, distearyl ammonium chloride, distearyl ammonium bromide, dicetyl methyl ammonium chloride, dicetyl methyl ammonium bromide, dilauryl methyl ammonium chloride, distearyl methyl ammonium chloride, distearyl methyl ammonium bromide, ditallow dimethyl ammonium chloride, ditallow dimethyl ammonium sulfate, di(hydrogenated tallow) dimethyl ammonium chloride, di(hydrogenated tallow) dimethyl ammonium acetate, ditallow dipropyl ammonium phosphate, ditallow dimethyl ammonium nitrate, di(coconutalkyl) dimethyl ammonium chloride, di(coconutalkyl) dimethyl ammonium bromide, tallow ammonium chloride, coconut ammonium chloride, stearamidopropyl PG-imonium chloride phosphate, stearamidopropyl ethyldimonium ethosulfate, stearimidopropyldimethyl (myristyl acetate) ammonium chloride, stearamidopropyl dimethyl cetearyl ammonium tosylate, stearamidopropyl dimethyl ammonium chloride, stearamidopropyl dimethyl ammonium lactate, ditallowyl oxyethyl dimethyl ammonium chloride, behenamidopropyl PG dimonium chloride, dilauryl dimethyl ammonium chloride, distearly dimethyl ammonium chloride, dimyristyl dimethyl ammonium chloride, dipalmityl dimethyl ammonium chloride, distearyl dimethyl ammonium chloride, stearamidopropyl PG-dimonium chloride phosphate, stearamidopropyl ethyldiammonium ethosulfate, stearamidopropyl dimethyl (myristyl acetate) ammonium chloride, stearimidopropyl diemthyl cetaryl ammonium tosylate, stearamido propyl dimethyl ammonium chloride, stearamidopropyl dimethyl ammonium lactate, and combinations thereof.

Likewise, any one of a number of commercially available, well-known non-ionic surfactants are contemplated for use, including, but not limited to, alcohols, alkanolamides, amine oxides, esters (including glycerides, ethoxylated glycerides, polyglyceryl esters, sorbitan esters, carbohydrate esters, ethoxylated carboxylic acids, phosphoric acid triesters), ethers (including ethoxylated alcohols, alkyl glucosides, ethoxylated polypropylene oxide ethers, alkylated polyethylene oxides, alkylated polypropylene oxides, alkylated PEG/PPO copolymers), silicone copolyols, alkylated silicone copolyols. Specific examples of non-ionic surfactants contemplated for use include, but are by no means limited to, cetearyl alcohol, ceteareth-20, nonoxynol-9, C12-15 pareth-9, POE(4) lauryl ether, cocamide DEA, glycol distearate, glyceryl stearate, PEG-100 stearate, sorbitan stearate, PEG-8 laurate, polyglyceryl-10 trilaurate, lauryl glucoside, octylphenoxy-polyethoxyethanol, PEG-4 laurate, polyglyceryl diisostearate, polysorbate-60, PEG-200 isostearyl palmitate, sorbitan monooleate, polysorbate-80, and combinations thereof.

In addition, any one of a number of commercially available, well-known amphoteric surfactants are contemplated for use, including, but not limited to, betaines; sultaines; hydroxysultaines, amido betaines, amidosulfo betaines; and combinations thereof. Specific examples of amphoteric surfactants contemplated for use include, but are by no means limited to, cocoamidopropyl sultaine, cocoamidopropyl hydroxyl sultaine, cocoamidopropylbetaine, coco dimethyl carboxymethyl betaine, lauryl dimethyl carboxymethyl betaine, lauryl dimethyl alphacarboxyethyl betaine, cetyl dimethyl carboxymethyl betaine, cetyl dimethyl betaine, lauryl (2-bishydroxy) carboxymethyl betaine, stearyl bis-(2-hydroxyethyl) carboxymethyl betaine, oelyl dimethyl gamma-carboxypropyl betaine, lauryl bis-(2-hydroxypropyl)alpha carboxymethyl betaine, coco dimethyl sulfopropyl betaine, stearyl dimethyl sulfopropyl betaine, lauryl dimethyl sulfoethyl betaine, lauryl bis(2-hydroxyethyl) sulfopropyl betaine, oleyl betaine, cocamidopropyl betaine, and combinations thereof.

In one or more preferred embodiments of the present invention, the following surfactants were found to be particularly beneficial as substrate wetting agents, namely: Masurf FS-2800 (Mason Chemical Company) Byk-328 (BYK-Chemie), Byk-333 (BYK-Chemie), Byk-346 (BYK-Chemie), Byk-348 (BYK-Chemie), Surfactol 365, Surfynol 104E (Air Products), Surfynol GA (Air Products), Wet KL 245 (Tego-Degussa Goldschmidt), Novel TDA 30, and EFKA-4580 (EFKA-Ciba Specialty Chemicals).

Rheology modifiers for use in accordance with the present invention preferably include, for example, Borchigel PW25 (Lanxess Corporation), Alcogum L 520 (AkzoNobel), Aerosil 200 (Degussa), Rheolate 255 (Elementis Specialties), Borchigel PW25 (Lanxess Corporation) and SN-Thickener 612 NC (San Nopco Korea Ltd.).

PH modifiers for use in accordance with the present invention preferably include, for example, Formic Acid, as well as other strong and weak acids.

Matting agents for use in accordance with the present invention preferably include, for example, Acematt TS100 silica and Syloid 55.

Defoaming agents for use in accordance with the present invention preferably include, for example, Agitan 299 (Ultra Additives), Byk-024 (BYK-Chemie) polysiloxane, Byk-025 (BYK-Chemie), and Surfynol 104 BK (Air Products).

Lubricity modifiers/taber additives for use in accordance with the present invention preferably include, for example, include Fluoroslip 511 (Shamrock Technologies, Inc.), Rosilk 2229, and Microspersion 190.

Fillers for use in accordance with the present invention preferably include, for example, Sachtleben Micro (Sachtleben Corporation), Huber 70 C (Huber Engineered Materials), and Steabright (Luzenac America).

Suitable biodegradation additives and/or bio-assimilation promoting additives include those commercially available from, for example, Biosphere, (Pellet Additive 201, Additive 3). Additional examples include those disclosed in U.S. Pat. No. 11,254,815 entitled “Polyolefin Polylactic Acid Polymer Blends,” United States Patent Application Publication Number 2022/0235184 entitled “Bio-Assimilation Master Batch Composition, Processes for Producing Polymeric Bio-Assimilating Material Therefrom, and Products Produced Therefrom,” United States Patent Application Publication Number 2005/0250890 entitled “Masterbatch for Thermoplastic Compositions,” European Patent Number EP3687761 entitled “Modified Polyethylene Compositions and Method for Making the Same,” and Belgium Patent Number BE789277 entitled “Composition of Ethylene Polymer Degradable under the Action of Weather”—all of which are hereby incorporated herein by reference in their entirety including all references cited therein. Preferably these additives are present in a concentration ranging from approximately (+/−0.05%) 0.25% by weight to approximately 5.00% by weight, and more preferably from approximately 0.50% by weight to approximately 2.00% by weight, and yet most preferably approximately 0.75% by weight to approximately 1.25% by weight. In accordance with the present invention, the base material, resin and/or plastic may comprise traditional petroleum based materials, bio-based materials and/or any combination thereof-without or without any combination of additives disclosed herein.

While the present disclosure has been primarily directed toward sponges, loofahs, shower gloves, exfoliating mittens, and cleansing accessories, other products are likewise within the scope of the present invention, including oral care products, such as toothbrushes, dental picks, etcetera. Non-limiting examples include those disclosed in U.S. Pat. No. 9,930,957 entitled “Dental Devices with Liquid Applicator,” U.S. Pat. No. 8,668,493 entitled “Liquid Interdental Cleaner,” U.S. Pat. No. 6,957,958 entitled “Unit Dose Applicator with Material Chamber,” U.S. Pat. No. 5,908,257 entitled “Toothpaste Dispensing Toothbrush,” U.S. Pat. No. 5,906,213 entitled “Flossing Device and Method of Use,” U.S. Pat. No. 5,365,956 entitled “Toothbrush and Dental Floss Holder,” U.S. Pat. No. 5,346,324 entitled “Dentifrice Dispensing Toothbrush with Replaceable Cartridge,” United States Patent Application Publication Number 2010/0284726 entitled “Liquid Dentifrice Dispensing Toothbrush,” International Patent Application Publication Number WO 1991/007143 entitled “Dental Floss Applicators,” and Korean Patent Application Publication Number 10-1268233 entitled “Oral Care Implement Having Fluid Delivery System”—all of which are hereby incorporated herein by reference in their entirety including all references cited therein.

The products of the present invention are preferably fabricated in accordance with the methods disclosed in U.S. Pat. No. 11,518,124 B2 Entitled “Method and Apparatus for Manufacturing a Wrinkled Net,"—which is hereby incorporated herein by reference in its entirety including all references cited therein. The '124 patent discloses steps 1-4 (S1-S4) which is preferably augmented with one or more steps (S5) herein below. The present invention encompasses all products made by the processes disclosed herein. To enhance composability of the products disclosed herein, the products undergo a fifth process step, namely: heating the products in a convection oven having the following parameters: (a) temperature approximately (+/−10%) 80-100 degrees centigrade; (b) pressure approximately (+/−10%) one atmosphere, (c) convection air velocity approximately (+/−10%) 100-200 feet per minute, (d) exposure/bake time approximately (+/−10%) 3-5 minutes; and (e) atmospheric conditions N or Ar. Lastly, the products can be packed under positive pressure of an inert gas (e.g., Nitrogen, Argon, etcetera) and/or under a vacuum or atmosphere free environment to enhance shelf and/or storage life of the products disclosed herein-especially those with biodegradation additives.

The invention is further described by additional examples and experiments hereinbelow.

TABLE I

| S. No | Composition | Load (Wt. %) |
|---|---|---|
| 1 | Bio-based Plastic (Sugar Cane Derived) | 100 |

TABLE II

| S. No | Composition | Load (Wt. %) |
|---|---|---|
| 1 | Bio-based Plastic (Sugar Cane Derived) | 96 |
| 2 | Lubricity Modifier | 2 |
| 3 | Colorant | 2 |

TABLE III

| S. No | Composition | Load (Wt. %) |
|---|---|---|
| 1 | Bio-based Plastic (Sugar Cane Derived) | 48 |
| 2 | Bio-based Plastic (Tapioca Starch Derived) | 48 |
| 3 | Lubricity Modifier | 2 |
| 4 | Colorant | 2 |

TABLE IV

| S. No | Composition | Load (Wt. %) |
|---|---|---|
| 1 | Bio-based Plastic (Tapioca Starch Derived) | 100 |

TABLE V

| S. No | Composition | Load (Wt. %) |
|---|---|---|
| 1 | Bio-based Plastic (Tapioca Starch Derived) | 96 |
| 2 | Lubricity Modifier | 2 |
| 3 | Colorant | 2 |

TABLE VI

| S. No | Composition | Load (Wt. %) |
|---|---|---|
| 1 | Bio-based Plastic (Sugar Cane Derived) | 45 |
| 2 | Bio-based Plastic (Tapioca Starch) | 45 |
| 3 | Lubricity Modifier | 2 |
| 4 | Colorant | 2 |
| 5 | Surfactant | 1 |
| 6 | Filler (Carbon) | 5 |

TABLE VII

| S. No | Composition | Load (Wt. %) |
|---|---|---|
| 1 | Bio-based Plastic (Sugar Cane Derived) | 0-50 |
| 2 | Bio-based Plastic (Tapioca Starch) | 0-50 |
| 3 | Lubricity Modifier | 0-3 |
| 4 | Colorant | 0-3 |
| 5 | Surfactant | 0-5 |
| 6 | Filler (Carbon) | 0-10 |
| 7 | Solvent | 0-5 |
| 8 | Wetting Agent | 0-3 |
| 9 | Defoaming Agent | 0-4 |
| 10 | Biodegradation Additive | 0-5 |
| 11 | Bio-assimilation Promoting Additives | 0-5 |

TABLE VIII

| S. No | Composition | Load (Wt. %) range, preferred range, most preferred % |
|---|---|---|
| 1 | Bio-based Plastic (Sugar Cane Derived) | 0-99, 0-35, 35 |
| 2 | Bio-based Plastic (Tapioca Starch) | 0-99, 0-35, 35 |
| 3 | Lubricity Modifier | 0-5, 0-3, 2 |
| 4 | Colorant | 0-3, 0-2, 1 |
| 5 | Primary Surfactant | 0-10, 0-5, 2 |
| 6 | Secondary Surfactant | 0-10, 0-5, 2 |
| 7 | Filler (Carbon) | 0-10, 0-5, 5 |
| 8 | Solvent | 0-10, 0-5, 5 |
| 9 | Wetting Agent | 0-3, 0-2, 1 |
| 10 | Defoaming Agent | 0-4, 0-3, 1 |
| 11 | Biodegradation Additive | 0-5, 0.25-2, 1 |
| 12 | Bio-assimilation Promoting Additives | 0-5, 0.25-2, 1 |

The foregoing description merely explains and illustrates the invention and the invention is not limited thereto except insofar as the appended claims are so limited, as those skilled in the art who have the disclosure before them will be able to make modifications without departing from the scope of the invention.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etcetera shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etcetera. As a non-limiting example, each range discussed herein can be readily broken down into a lower third, middle third and upper third, etcetera. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed and desired to be secured by Letters Patent of the United States is:

1. A cleansing sponge for a user's body, consisting of:

a body consisting of a bio-based low-density polyethylene derived from sugar cane, wherein the bio-based low-density polyethylene has a density ranging from approximately 917 to approximately 930 $kg/m^3$ and comprises at least 98% by weight bio-based content; and a fixing string attached to the body, wherein the cleansing sponge is compostable within 90 days according to ASTM 6400.

2. A cleansing loofah for a user's body, consisting of:

a body consisting of (i) a bio-based material derived from tapioca starch, wherein the bio-based material consists of a hydrophobic thermoplastic starch having at least 80% by weight bio-based content, and (ii) a biodegradation additive present in a concentration ranging from approximately 0.50% to approximately 2.00% by weight; and a fixing string attached to the body.

3. A method of manufacturing a bio-based cleansing product, consisting of the steps of:

(a) providing a body of a bio-based material derived from sugar cane, tapioca starch, or a combination thereof, the body being shaped as a sponge, a loofah, or a shower glove;

(b) attaching a fixing string to the body;

(c) heating the body in a convection oven at a temperature ranging from approximately 80 to approximately 100 degrees Centigrade, at a pressure of approximately one atmosphere, with a convection air velocity ranging from approximately 100 to approximately 200 feet per minute, for a duration ranging from approximately 3 to approximately 5 minutes, under an atmosphere consisting of nitrogen, argon, or a combination thereof;

(d) cooling the body to ambient temperature; and (e) packaging the body under positive pressure of an inert gas selected from the group consisting of nitrogen and argon.

* * * * *